March 17, 1942.                J. FERGUSON                2,276,295
                    ELECTRIC GLASS MELTING FURNACE
                         Filed June 14, 1940
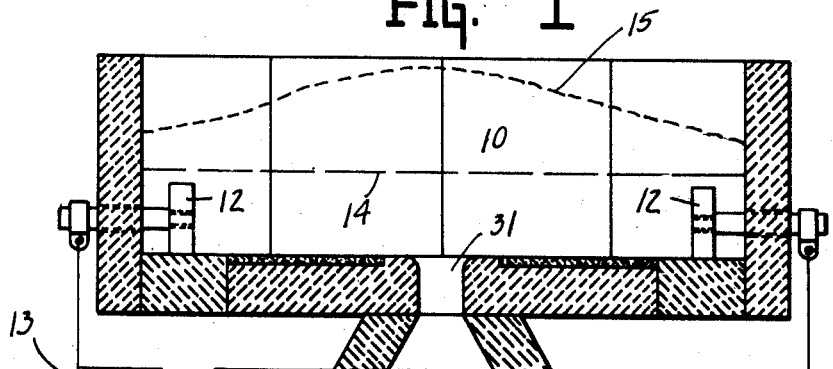
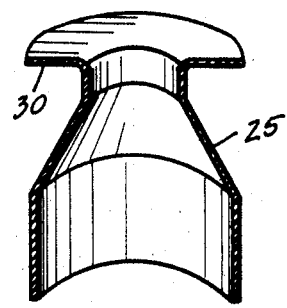
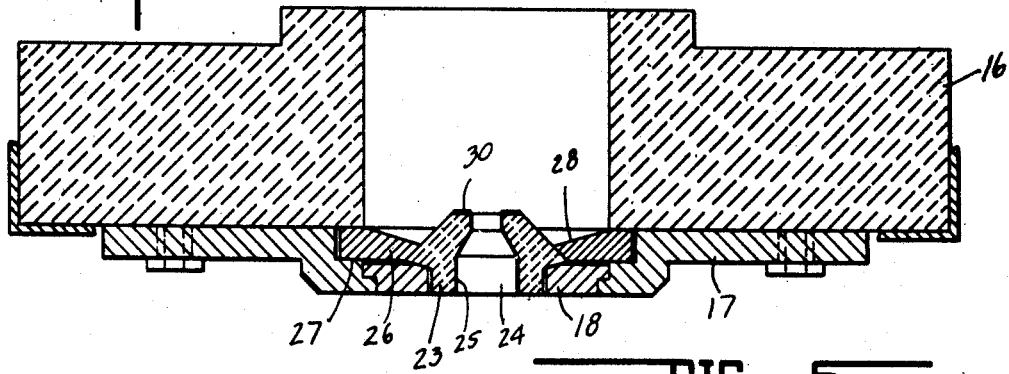
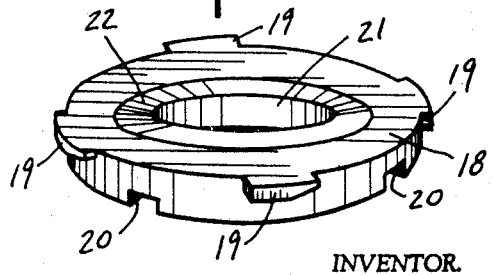
INVENTOR.
JOHN FERGUSON.
BY Lockwood, Goldsmith & Galt.
ATTORNEYS.

Patented Mar. 17, 1942

2,276,295

UNITED STATES PATENT OFFICE 2,276,295

ELECTRIC GLASS MELTING FURNACE

John Ferguson, Cleveland, Ohio

Application June 14, 1940, Serial No. 340,433

3 Claims. (Cl. 13—6)

This invention relates to a discharge orifice construction for glass melting furnaces. In my prior Patent No. 2,186,718, issued January 9, 1940, I have disclosed a discharge orifice construction for glass making furnaces in which the orifice block acts as an electrode to transmit electric current to the stream of glass discharged through the orifice for the purpose of regulating the temperature and consistency of the glass and for preventing skin cooling of the stream. The present invention has for one object the provision of an improved construction of this type.

A more specific object is to provide an orifice construction suitable for use with a furnace in which a relatively large collecting well is used beneath the melting furnace proper.

Another object of the invention is to arrange the electrode and orifice construction so as to prevent accumulation of relatively cool stagnant glass in the region of the discharge orifice.

The invention is particularly applicable to the type of furnace disclosed in my copending application Serial No. 334,757, filed May 13, 1940, of which the instant application is a continuation in part, but may be used with other types of furnace as well, or may be used in connection with a forehearth of the type employed in fuel fired tank furnaces.

Other objects of the invention and the full nature thereof will be understood from the accompanying drawing and the following description and claims:

Fig. 1 is a sectional view through an electric glass melting furnace to which the invention has been applied in one of its preferred forms. Fig. 2 is a similar view of the orifice construction on a larger scale. Fig. 3 is a perspective sectional view of a bushing used for lining the orifice proper. Fig. 4 is a similar view of an electrode member. Fig. 5 is a perspective view of a retainer ring used for maintaining the parts in assembled relation.

Referring now to Fig. 1 there is shown an electric furnace having a melting chamber 10 beneath the floor of which is located a discharge well 11. Electrodes 12 herein shown as two in number are indicated at opposite ends of the melting chamber 10 and are supplied with current from a transformer 13 for melting the glass making materials within the furnace. In operation the well 11 and the chamber 10 are normally filled with molten glass to the level of broken line 14 and unmelted batch material is heaped upon the molten glass as indicated by broken line 15. The walls and floor of the melting chamber and discharge well are constructed of suitable refractory material. At the bottom of the discharge well 11 there is provided a refractory block 16 to the undersurface of which there is secured a metallic plate 17 having a central aperture in which there is seated a retainer ring 18 shaped as best seen in Fig. 5. Said ring is provided with lugs 19 adapted to enter mating openings in the plate 17 and to retain the ring 18 in place when the same has been rotated by means of a suitable tool engaging radial slots 20 in the undersurface thereof. The retaining ring 18 has a central aperture 21 surrounded by an inwardly inclined surface 22 in which there is seated an orifice block 23. Said block is formed of a suitable refractory material adapted to withstand the relatively high temperatures involved. The material commercially known as zircon has been found suitable for the purpose.

The orifice block 23 is provided with a central discharge orifice 24 which may be shaped to provide the peculiar effects discussed in my prior Patent No. 2,186,718, previously mentioned. Said orifice is lined by means of a bushing 25 particularly shown in Fig. 3 and constructed of an electrical conducting material having suitable heat resisting properties. An alloy of approximately 10% rhodium and 90% platinum has been found suitable for the purpose in certain cases. In other cases metallic tungsten, tungsten carbide or graphite may be used. The choice of material depends largely on the type of glass being run and the temperatures required. An electrode ring 26 shown in detail in Fig. 4 rests on a shoulder 27 in the plate 17 and surrounds the block 23. Said electrode ring is provided with an inwardly inclined surface 28.

A suitable electric potential may be established between the ring 26 and either or both of the electrodes 12 for passage of current therebetween through the molten glass in the discharge well 11. One such arrangement is shown in Fig. 1 in which a variable transformer 29 has one terminal connected to the midpoint of the secondary winding of transformer 13 and its opposite terminal connected to the plate 17 which is in electrical contact with the ring 26. The bushing 25 is formed with an outwardly turned flange 30 overlying the upper surface of the orifice block 23 and said block is so shaped that said flange is spaced from the electrode ring 26. With this construction the shortest current path is in a direct line from the electrode ring 26 to an opening 31 separating the melting chamber and collecting well. However, in the region of the electrode the hottest glass is near the center of the well and since the hotter glass has a lower electrical resistance and since the specific resistance of the flange 30 is even less, an appreciable portion of the current flowing from the electrode ring 26 passes through the glass close to the upwardly inclined upper surface of the block 23 through the flange 30 to the glass passing into the discharge orifice 24. This portion of the current provides for prevention of skin cooling of the stream of glass as it passes through the orifice in a similar manner to that in the construction shown in my prior Patent No. 2,186,718. At the same time the current passing between the electrode and the bushing 30 and the portion of the current passing directly from the ring 26 to the opening 31 serve to heat the glass around the orifice and to prevent accumulation of relatively cool, stagnant glass in that position. The shape of the block 23 and the inclination of the surface of the orifice ring 26 are so chosen as to permit the proper amount of current to be by-passed through the flange 30. At the high temperatures involved, the material of the block 23 does not provide perfect insulation and there is a small flow of current through said block to the bushing 25. This current adds to the heating effect of that passing through the flange 30.

From the foregoing description it will be apparent that the invention provides improved apparatus for heating the surface of a stream of glass passing through a discharge orifice and also provides a large electrode surface distinct from the orifice block itself for passage of current for heating the glass in the discharge well. Thus a relatively large discharge well and correspondingly greater current flow may be used without undue concentration of current at the electrode surface.

The invention has been described in one of its preferred forms, the details of which may be varied without departing from the scope thereof as defined by the appended claims.

The invention claimed is:

1. In a discharge orifice construction for a chamber adapted to contain molten glass, a refractory orifice block having a discharge orifice therein, an electrical conducting lining for said orifice, an electrode ring surrounding said orifice, spaced from said lining and in contact with molten glass in said chamber, and means for passing an electric current between said ring and said lining through said molten glass.

2. In a discharge orifice construction for a chamber adapted to contain molten glass, a refractory orifice block having a discharge orifice therein, an electrical conducting lining for said orifice, an electrode in the floor of said chamber spaced from said lining, a second electrode in contact with molten glass and remote from said orifice, and means for passing an electric current through said glass between said electrodes, said lining being located with respect to said electrodes so that at least a part of said current passes through said glass from one electrode to said lining and thence to the other electrode.

3. In a discharge orifice construction for a chamber adapted to contain molten glass, a refractory orifice block having a discharge orifice therein, an electrical conducting lining for said orifice, an electrode ring surrounding said orifice, spaced from said lining and in contact with molten glass in said chamber, a second electrode in contact with molten glass and remote from said orifice, and means for passing an electric current through said glass between said electrodes, said lining being located with respect to said electrodes so that at least a part of said current passes through said glass from one electrode to said lining and thence to the other electrode.

JOHN FERGUSON.